Dec. 11, 1934.  W. W. CARTER  1,984,113
SILENT GEAR AND PROCESS OF MANUFACTURE
Filed Oct. 7, 1933
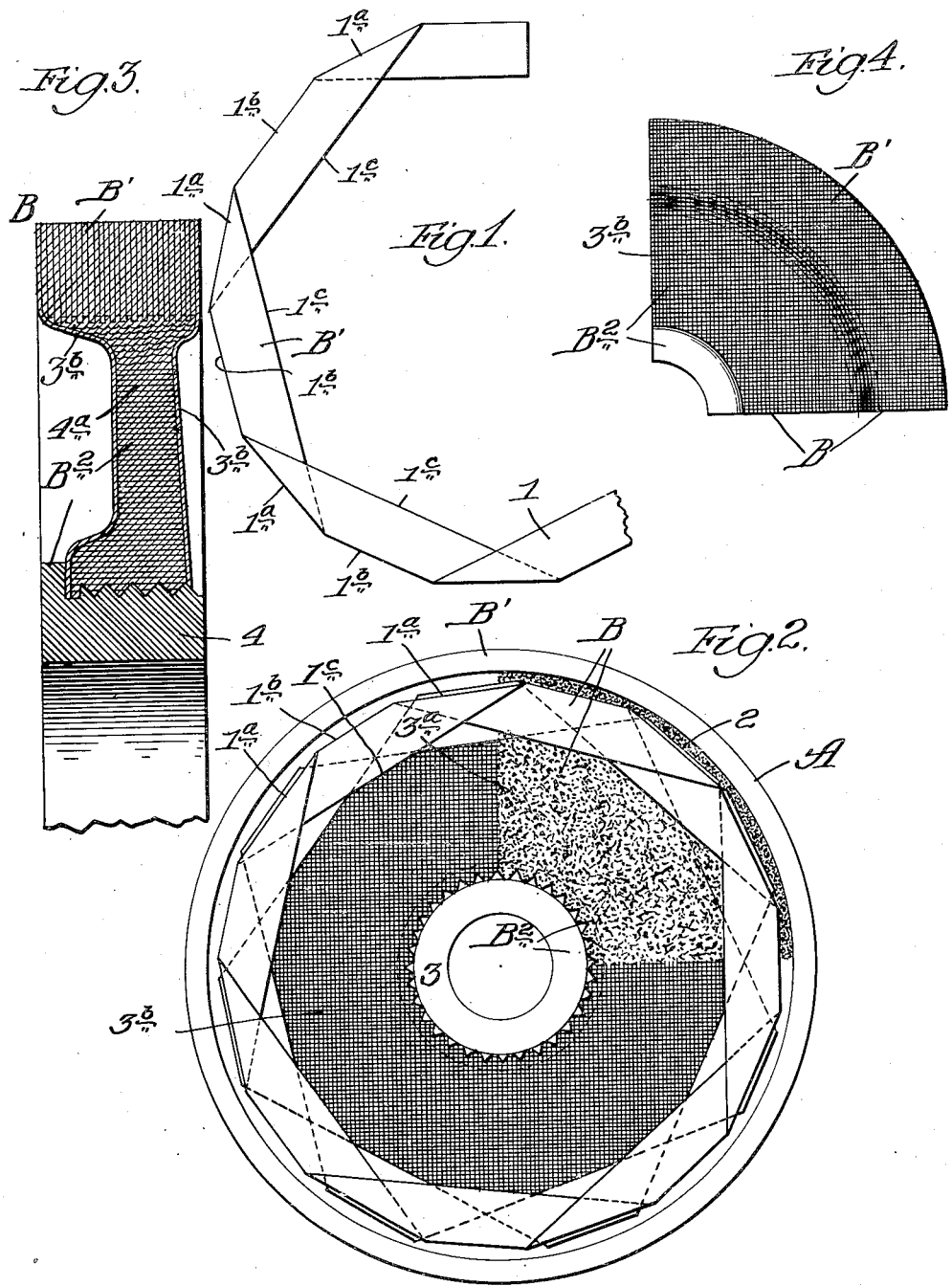

Patented Dec. 11, 1934

1,984,113

UNITED STATES PATENT OFFICE 1,984,113

SILENT GEAR AND PROCESS OF MANUFACTURE

William Wesley Carter, Cincinnati, Ohio, assignor to The Formica Insulation Company, Cincinnati, Ohio, a corporation of Ohio Application October 7, 1933, Serial No. 692,669

11 Claims. (Cl. 154—2)

This invention relates particularly to the manufacture of silent gears and to an improved method of manufacturing the same.

The primary object is to provide an improved product and an improved method of manufacturing the same, which will avoid waste of materials. Incidentally, the presence of "resin-pockets", especially in the rim-portion of the gear, is largely avoided.

In accordance with the improved process, an assembly is produced which comprises a wheel-center composed of binder-impregnated fibrous material, and a polygonally-folded binder-impregnated strip which provides a rim-portion; and the assembly is consolidated under heat and pressure.

For best results, the binder employed is a thermally reactive artificial resin, such as a potentially-reactive phenolic condensation product, which will harden and become infusible and substantially insoluble when subjected to the action of heat. The change to the infusible and substantially insoluble condition will be effected wholly in the mold, or partially in the mold and partially by continued application of heat after removal from the mold.

The invention is illustrated in a preferred embodiment in the accompanying drawing, in which—

Fig. 1 is a broken plan view illustrating the manner in which a binder-impregnated strip is polygonally folded (to approximate a ring), it being understood that the folding of the strip is continued until several layers have accumulated; Fig. 2 a plan view showing an assembly in a mold, the wheel-center being composed largely of binder-impregnated macerated fibrous material, the upper layer of fabric which is preferably employed being omitted from this view; Fig. 3, a broken sectional view illustrating a molded assembly in which the wheel-center is composed of a spirally wound impregnated tape, the mold being omitted from this view; and Fig. 4, a plan view of a quarter-section of a gear blank constructed in accordance with the invention.

Referring to Figs. 1, 2 and 4, A designates one member of a mold; and B designates a wheel assembly, prior to the consolidating operation. The rim-portion of the wheel is designated B' and the wheel-center is designated B².

The rim-portion preferably comprises a series of layers of binder-impregnated tape 1 which is folded into polygonal form (to approximate a ring). Preferably, one employs a straight strip of fabric which has been impregnated with a potentially reactive artificial resin and dried. This strip is subjected to a series of folds along diagonal lines 1ª, as illustrated in Fig. 1. The lines of folding become segments of a circle, and the outer edges 1ᵇ of the tape, which intervene between the lines of folding, also become segments of the circle. The inner edges of the portions of the folded tape are designated 1ᶜ, and it will be noted that these lines are much longer than the outer segmental lines 1ª and 1ᵇ. It is not essential that the lines 1ᵇ be of the same length as the lines 1ª. As the tape, or strip, is subjected to successive folding operations, the layers accumulate upon each other, in a general circular form, thus producing a built-up rim-assembly which may be placed within the peripheral flange of the die, or mold, A.

If desired, impregnated macerated fibrous material 2 may be introduced into the mold to fill any segmental recesses between the rim-portion of the assembly and the flange of the mold. Also, in Fig. 2, the macerated material supplements the inner portions of the tape 1.

The wheel-center B² is shown as comprising a metal hub 3 and a web 3ª of binder-impregnated macerated material. The web-portion is supplemented by fabric disks 3ᵇ, one of which may be placed in the mold before the remainder of the assembly is introduced, and the other of which may be applied just before closing the mold. The arrangement in this respect is similar to the illustration given in Fig. 3.

In producing the assembly in the mold, macerated material may be allowed to fill any spaces intervening between the layers of the polygonally folded strip 1.

Assuming a thermally reactive binder to be employed in connection with the fibrous material (whether woven fabric, macerated scrap-fabric, or molding-powder containing fibrous material), the assembly is consolidated under heat and pressure in a manner well known in the art, and the binder is converted to an infusible and substantially insoluble state.

Fig. 4 illustrates a quarter-section of a finished gear product made in accordance with the invention. It may be understood to represent the final product produced in accordance with the illustration in Figs. 1 and 2, or by any modification of the manner of making the assembly.

In Fig. 3, the construction is similar to that already described, and the parts are designated, generally, by the same reference characters. In this example, however, the wheel-center is shown as comprising a metallic hub 4 and a web 4ᵃ which is formed by winding impregnated tape upon itself spirally, so that the laminations initially are concentric with the axis of the wheel. In this modification, the rim B' may be understood as being formed in the manner illustrated in Figs. 1 and 2. Binder-impregnated fabric disks 3ᵇ form the side walls of the assembly, the same as in the first-described construction. When the assembly used in Fig. 3 is introduced into a mold and consolidated under heat and pressure, the effect is to form wrinkles in the layers 4ᵃ and bend the lateral edges outwardly, and the outer layers become intermeshed with the inner portions of the layers which form the rim-portion of the assembly. Thus, after the gear blank has been consolidated by heat and pressure, the wheel-center is strongly bound to the rim. This is true in both of the constructions described.

It is noteworthy that the manner of forming the successive layers which make up the rim-portion of the gear blank is such as to give great strength to the rim-portion in tangential directions. As noted in Fig. 2, the folding of the strip in producing the layers forming the rim-portion may be done in such manner that the lengths of the segments will mismatch, or bear a staggered relation. This not only tends to produce uniformity of filling, but also to enhance the strength of the rim-portion of the gear-blank.

The assembly may be made up in any suitable manner to employ the principle of a folded impregnated strip for forming the rim-portion of the gear-blank. The wheel-center may be of any suitable material. Any suitable binder may be employed, but a thermally reactive artificial resin possesses great advantages for gear purposes.

If desired, the hub-portion of the gear-blank may be formed in a manner analogous to that employed in forming the rim-portion. That is, a binder-impregnated strip may be folded into polygonal form to provide a hub-portion. This may be supplemented by a central metallic bushing such as the bushing 4 shown in Fig. 3. Where a metallic hub-portion is employed, it is desirable to roughen the circumferential surface in the manner illustrated in Figs. 2 and 3, so that the non-metallic portion of the gear will become firmly interlocked with the metallic portion.

The present invention makes it possible to utilize scrap material and prevent the formation of unnecessary scrap material. Thus, a binder-impregnated sheet may be cut into straight strips, and these strips may be employed for forming rim-assemblies. Scrap material may be macerated and used to supplement the inner margins of the polygonally folded strips in making up the rims, and also such macerated scrap material may be used in forming the webs.

Referring to Fig. 2, the macerated material at 2 may be omitted, and the dies may be depended upon to so compress and compact the fabric layers as to substantially fill all voids at the outer portion of the rim, thus insuring the greatest gear-tooth strength after the gear-cutting operation.

The foregoing detailed description has been given for clearness of understanding only, and no unnecessary limitations should be understood therefrom, but the appended claims should be construed as broadly as permissible, in view of the prior art.

What I regard as new and desire to secure by Letters Patent is:

1. A process for manufacturing gear blanks comprising: producing an assembly comprising a wheel-center comprising binder-impregnated fibrous material and a rim-portion comprising a a polygonally folded binder-impregnated strip of fabric, the lines of folding being substantially chords of arcs of a circle; and molding the assembly under heat and pressure.

2. A process as set forth in claim 1, in which the assembly includes binder-impregnated fabric disks which form the side walls of the gear-blank.

3. In the manufacture of a gear-blank, the step in forming a rim which comprises polygonally folding a strip with the line of folding forming chords of a circle, substantially, and incorporating the strip thus folded in the rim.

4. A process as set forth in claim 3, characterized by impregnating the strip with a solution of an artificial resin and drying it before folding the strip.

5. In the manufacture of a gear-blank, the step which comprises forming a rim-assembly by polygonally folding a binder-impregnated strip of fabric, the lines of folding being substantially chords of arcs of a circle, and continuing the folding of the strip until there have been produced a plurality of superposed layers of polygonal form.

6. The process as set forth in claim 5, characterized by the segments of the layers being out of registration.

7. A process of manufacturing a gear blank which comprises: introducing into a mold an assembly comprising a plurality of layers of a polygonally folded binder-impregnated strip of fabric, the lines of folding being substantially chords of arcs of a circle, a filling of binder-impregnated fibrous material adapted to form a web, and fibrous material supplementing the folded strip for forming the rim; and consolidating the assembly under heat and pressure.

8. A gear-blank comprising: a wheel-center comprising a web of binder-impregnated fibrous material; and a rim comprising a polygonally folded binder-impregnated strip of fabric whose lines of folding are substantially chords of arcs of a circle, the whole consolidated under heat and pressure.

9. A gear-blank as specified in claim 8, in which the web of the wheel-center comprises disks of woven fabric forming the side walls of the web and binder-impregnated macerated fibrous material between said disks.

10. A gear-blank as specified in claim 8, in which the web of the wheel-center comprises binder-impregnated fabric interlocking with the segments of the layers forming the rim.

11. A gear-blank comprising a wheel-center and a rim consolidated thereon comprising a polygonally folded strip impregnated with a heat-hardened resin, the lines of folding being at the outer periphery of the polygon.

WILLIAM WESLEY CARTER.